(12) United States Patent
Chang et al.

(10) Patent No.: US 8,736,800 B2
(45) Date of Patent: May 27, 2014

(54) DISPLAY DEVICE

(75) Inventors: Yu-Pei Chang, Tainan (TW); Ming-Huan Yang, Taichung (TW); Chen-Chu Tsai, Taichung (TW); Yan Li, Orlando, FL (US); Meizi Jiao, Orlando, FL (US); Shin-Tson Wu, Orlando, FL (US)

(73) Assignees: Industrial Technology Research Institute, Hsinchu (TW); University of Florida Research Foundation, Inc., Orlando, FL (US)

( * ) Notice: Subject to any disclaimer, the term of this patent is extended or adjusted under 35 U.S.C. 154(b) by 269 days.

(21) Appl. No.: 13/348,652

(22) Filed: Jan. 12, 2012

(65) Prior Publication Data

US 2012/0327350 A1 Dec. 27, 2012

Related U.S. Application Data

(60) Provisional application No. 61/500,631, filed on Jun. 24, 2011.

(51) Int. Cl.
*G02F 1/1343* (2006.01)
*G02F 1/1333* (2006.01)
*G02F 1/1337* (2006.01)

(52) U.S. Cl.
CPC .... *G02F 1/134363* (2013.01); *G02F 1/133371* (2013.01); *G02F 1/133707* (2013.01)
USPC .......................................................... 349/141

(58) Field of Classification Search
CPC ................... G02F 1/133371; G02F 1/134363; G02F 1/133707
USPC .......................................................... 349/141
See application file for complete search history.

(56) References Cited

U.S. PATENT DOCUMENTS

| | | | |
|---|---|---|---|
| 5,694,188 A | 12/1997 | Sano et al. | |
| 7,830,485 B2 * | 11/2010 | You et al. | 349/141 |
| 2009/0284707 A1 * | 11/2009 | Cho et al. | 349/160 |
| 2010/0195028 A1 * | 8/2010 | Kubota et al. | 349/106 |
| 2010/0302492 A1 * | 12/2010 | Kubota et al. | 349/138 |

FOREIGN PATENT DOCUMENTS

CN 101782702 7/2010

OTHER PUBLICATIONS

Rao et al., "Low Voltage Blue-Phase Liquid Crystal Displays", Applied Physics Letters, vol. 95, Issue 23, id. 231101 (3 pages) (2009).

Ge et al., "Electro-Optics of Polymer-Stabilized Blue Phase Liquid Crystal Displays", Applied Physics Letters 94, vol. 94 Issue:10, Issued on Mar. 2009, pp. 101104-1-101104-3.

(Continued)

*Primary Examiner* — Nathanael R Briggs
(74) *Attorney, Agent, or Firm* — Jianq Chyun IP Office

(57) ABSTRACT

A display device includes a first substrate, at least a first protrusion, a first electrode, a second substrate, at least a second protrusion, a second electrode and a display medium. The first protrusion is disposed on the first substrate. The first electrode is disposed on the first protrusion. The second substrate is disposed opposite to the first substrate. The second protrusion is disposed on the second substrate. The second electrode is disposed on the second protrusion, wherein the first electrode and the second electrode are displaced in a horizontal direction so as to form a lateral electric field therebetween. The display medium is sandwiched between the first and the second substrates.

9 Claims, 12 Drawing Sheets

(56) References Cited

OTHER PUBLICATIONS

Kim et al., "Wall-Shaped Electrodes for Reducing the Operation Voltage of Polymer-Stabilized Blue Phase Liquid Crystal Displays", Journal of Physics D: Applied Physics 42 (2009), issued on Nov. 9, 2009, pp. 1-4.

Haseba et al., "Large Electro-Optic Kerr Effect in Nanostructured Chiral Liquid-Crystal Composites Over a Wide Temperature Range", Advansed Materials, Article first published online: Aug. 16, 2005, pp. 2311-2315.

Rao et al., "Emerging Liquid Crystal Displays Based on the Kerr Effect", Molecular Crystals and Liquid Crystals, vol. 527, Issue 1, 2010, pp. 30/[186]-42/[198].

Rao et al., "Low Voltage Blue-Phase LCDS With Double-Penetrating Fringe Fields", This paper appears in: Display Technology, Journal of, Issued on Aug. 2010, vol. 6 Issue:8, On pp. 287-289.

Kikuchi et al.,"Polymer-Stabilized Liquid Crystal Blue Phases", Nature Materials 1, Published online: Sep. 2, 2002, pp. 64-68.

Meiboom et al., "Theory of the Blue Phase of Cholesteric Liquid Crystals", Phys. Rev. Lett. vol. 46, No. 18, May 4, 1981, pp. 1216-1219.

\* cited by examiner

DISPLAY DEVICE

CROSS-REFERENCE TO RELATED APPLICATION

This application claims the priority benefit of U.S.A. provisional application Ser. No. 61/500,631, filed on Jun. 24, 2011. The entirety of the above-mentioned patent application is hereby incorporated by reference herein and made a part of specification.

BACKGROUND OF THE DISCLOSURE

1. Technical Field

The disclosure is related to a display device for a low driving voltage display using optically isotropic liquid crystals that is useful for displays with high light efficiency and fast response time.

2. Background

With booming development of technology, consumers have higher demands on display quality of displays. Besides demands for specifications of resolution, contrast ratio, viewing angle, grey level inversion and color saturation of the display, the consumers have higher demands for the response time of the display.

To meet the needs of the consumers, display practitioners devote to developing blue phase liquid crystal displays (LCDs) having a quick response characteristic. Taking a blue phase liquid crystal material as an example, a horizontal electric field is generally required to achieve a light valve function thereof. Currently, an electrode design of an in-plane switching (IPS) display module is used to drive the blue phase liquid crystal molecules in the blue phase LCD.

However, in the electrode design of a typical IPS display module, many regions above the electrodes do not have the horizontal electric field, and many liquid crystal molecules in the blue phase LCD cannot be fluently driven, which may lead to low transmittance of the display module. If a high driving voltage is needed in the IPS display module, power consumption is also high. Therefore, how to resolve the problems of low transmittance and high driving voltage of the blue phase LCD is an important issue to be developed.

SUMMARY

A display device includes a first substrate, at least one first protrusion, a first electrode, a second substrate, at least one second protrusion, a second electrode and a display medium. The first protrusion is disposed on the first substrate. The first electrode is disposed on the first protrusion. The second substrate is disposed opposite to the first substrate. The second protrusion is disposed on the second substrate. The second electrode is disposed on the second protrusion, wherein the first electrode and the second electrode are displaced in a horizontal direction so as to form a lateral electric field therebetween, and the smallest gap between the first electrode and the second electrode in a vertical direction ranges from −100 µm to 100 µm. The display medium is sandwiched between the first and the second substrates.

A display device includes a first substrate, a plurality of first protrusions, a first electrode, a second electrode, a plurality of second protrusions, a third electrode, a fourth electrode and a display medium. The first protrusions are disposed on the first substrate, and each first protrusion has a first side wall and a second side wall. The first electrode is disposed on the first side wall of each first protrusion. The second electrode is disposed on the second side wall of each first protrusion, wherein a lateral electric field is formed between the first electrode on each first protrusion and the second electrode on the adjacent first protrusion. The second substrate is disposed opposite to the first substrate. The second protrusions are disposed on the second substrate, and each second protrusion has a third side wall and a fourth side wall. The third electrode is disposed on the third side wall of each second protrusion. The fourth electrode is on the fourth side wall of each second protrusion, wherein a lateral electric field is formed between the third electrode on each second protrusion and the fourth electrode on the adjacent second protrusion. The display medium is sandwiched between the first and the second substrates.

A display device includes a first substrate, a plurality of first protrusions, a first electrode, a second electrode, a plurality of second protrusions, a third electrode, a fourth electrode, a second substrate and a display medium. The first protrusions are disposed on the first substrate, and each first protrusion has a first side wall and a second side wall. The first electrode is disposed on the first side wall of each first protrusion. The second electrode is disposed on the second side wall of each first protrusion, wherein a lateral electric field is formed between the first electrode on each first protrusion and the second electrode on the adjacent first protrusion. The second protrusions are stacked on the first protrusions, and each second protrusion has a third side wall and a fourth side wall. The third electrode is disposed on the third side wall of each second protrusion and contacts with the first electrode on the first protrusions. The fourth electrode is disposed on the fourth side wall of each second protrusion and contacts with the second electrode on the first protrusions, wherein a lateral electric field is formed between the third electrode on each second protrusion and the fourth electrode on the adjacent second protrusion. The second substrate is opposite to the first substrate. The display medium is sandwiched between the first and the second substrates.

A display device comprises a first substrate, at least one first bump electrode, a second substrate, at least one second bump electrode, and a display medium. The first bump electrode is disposed on the first substrate. The second substrate is opposite to the first substrate. The second bump electrode is disposed on the second substrate, wherein the first bump electrode and the second bump electrode are displaced in a horizontal direction so as to form a lateral electric field therebetween, and a overlapping height between the first bump electrode and the second bump electrode in the vertical direction is larger than 0 and smaller than a cell gap between the first substrate and the second substrate. The display medium is sandwiched between the first and the second substrates.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The exemplary embodiments will be explained in more details with reference to the accompanying drawings. However, this invention may be embodied in more different forms, and should not be limited in its application to the details of the particular arrangements shown. Also, the terminology used herein is for the purpose of description and not of limitation. The method, system and device of the present invention disclose a design for producing a high aperture ratio, high transmittance, and wide viewing angle LCD device.

First Exemplary Embodiment

Figure 1A:
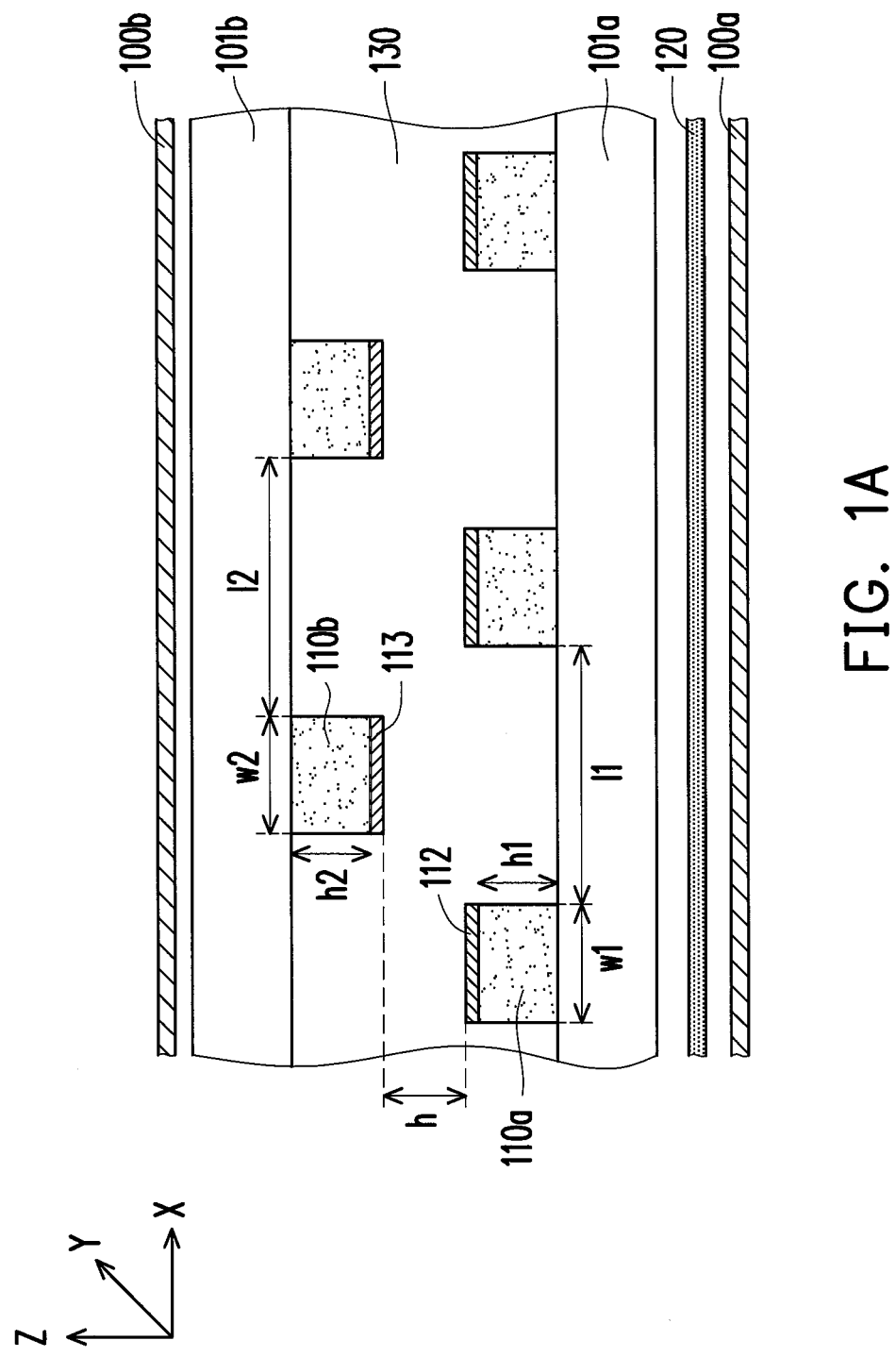
FIG. 1A and FIG. 1B show a schematic diagram of a pixel structure of a LCD according to a first exemplary embodiment.
Figure 1B:
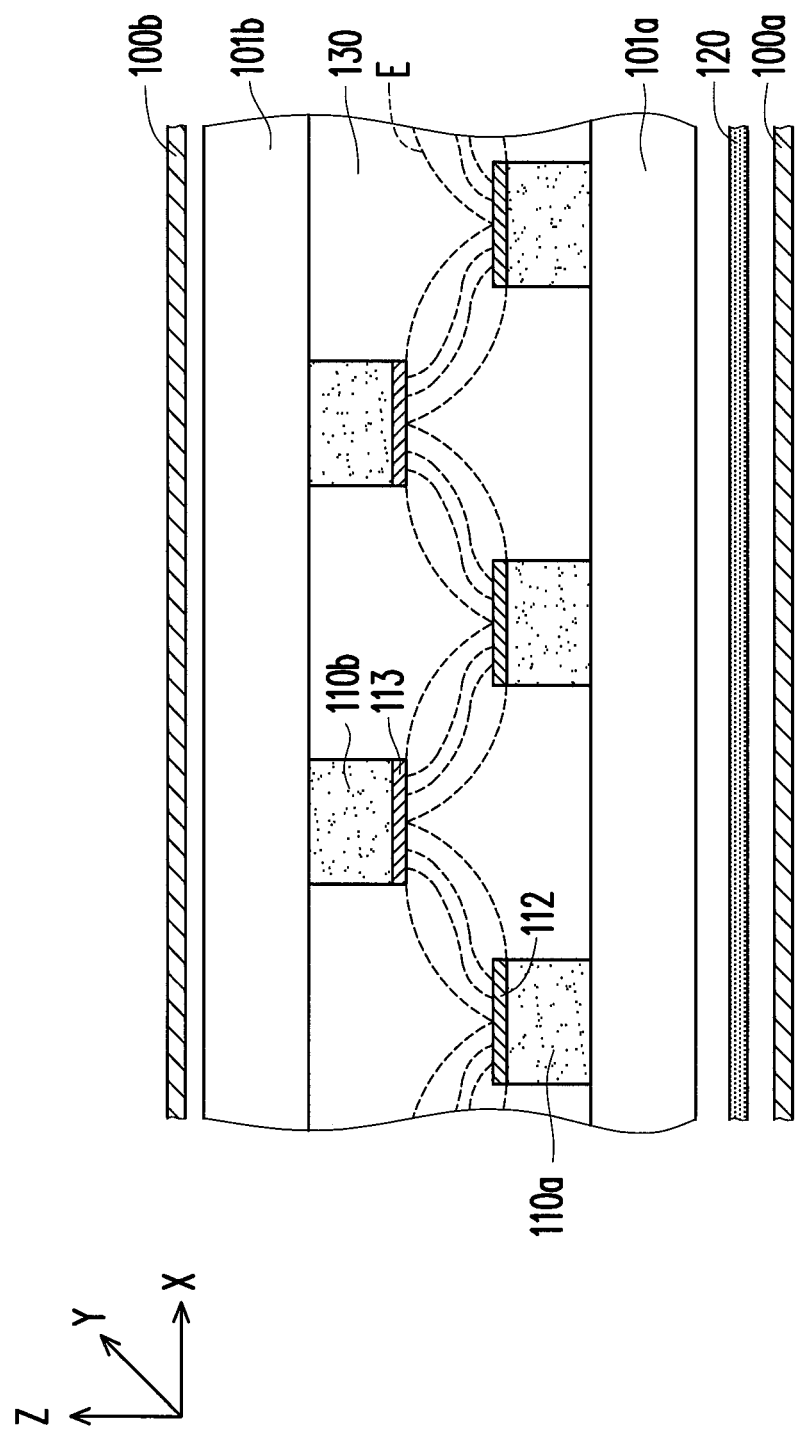

FIG. 1A and FIG. 1B show a schematic diagram of a pixel structure of a LCD according to a first exemplary embodiment. As shown in FIG. 1A, the display device includes a first substrate 101a, at least one first protrusion 110a, a first electrode 112, a second substrate 101b, at least one second protrusion 110b, a second electrode 113 and a display medium 130.

The first substrate 101a and the second substrate 101b are disposed opposite to each other and can be made of glass, quartz, an organic polymer, an opaque/reflective material (such as a conductive material, metal, wafer, ceramics, or any other appropriate material), or any other appropriate material.

The first protrusion 110a is disposed on the first substrate 101a. The second protrusion 110b is disposed on the second substrate 101b. The first protrusion 110a and the second protrusion 110b are made of a polymer, an inorganic material or any other suitable material. The first protrusion 110a and the second protrusion 110b are displaced in a horizontal direction. According to the embodiment, the first protrusion 110a and the second protrusion 110b are misaligned to each other in XY plane, and thus the first protrusion 110a and the second protrusion 110b are not overlapped to each other in XY plane. In addition, the first protrusion 110a and the second protrusion 110b have the same or different shapes from the cross-sectional view, and can take any shape that fabrication allows rather than rectangular as shown in FIG. 1. The thickness h1 of the first protrusion 110a and the thickness h2 of the second protrusion 110b could be from 0.2 μm to 100 μm. In addition, the width w1 of the first protrusion 110a and the width w2 of the second protrusion 110b may be the same or different, which respectively range from 0.2 μm to 100 μm. The gap l1 between two adjacent first protrusions 110a on the first substrate 101a and the gap l2 between two adjacent second protrusions 110b on the second substrate 101b may respectively range from 0.2 μm to 100 μm.

The first electrode 112 is disposed on the first protrusion 110a. The second electrode 113 is disposed on the second protrusion 110b. The first electrode 112 and the second electrode 113 respectively have a thickness ranged from 0.001 μm to 10 μm. The first electrode 112 and the second electrode 113 are displaced in the horizontal direction so as to form a lateral electric field E therebetween, as shown in FIG. 1B. The first electrode 112 and the second electrode 113 can be made of a metal, a transparent conductive material or any other suitable electrode material. In particular, the smallest gap h between the first electrode 112 and the second electrode 113 in a vertical direction (Z direction) ranges from −100 μm to 100 μm, preferably ranges from −100 μm to 10 μm, more preferably ranges from 0.5 μm to 10 μm.

Figure 3A:
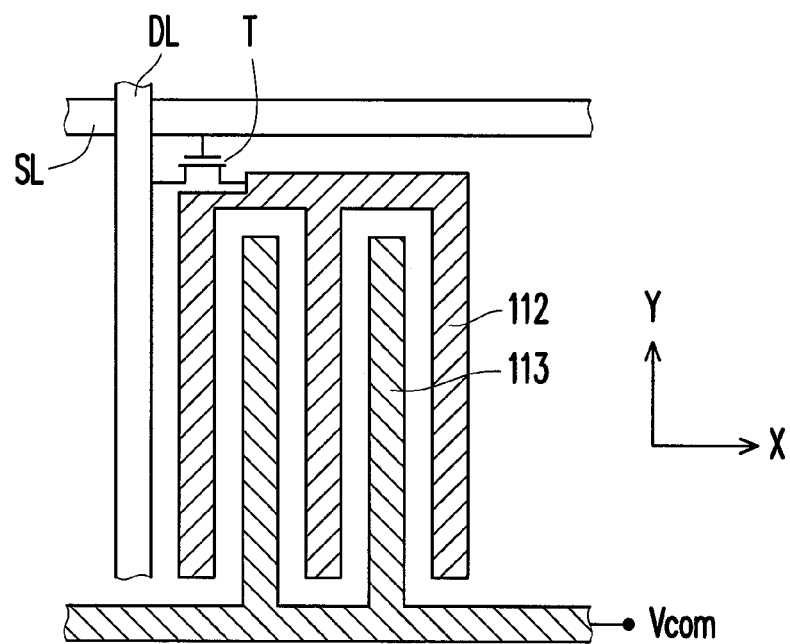
FIG. 3A is a schematic diagram showing a top view of the pixel structure in the first exemplary embodiment.

According to the exemplary embodiment, the first electrode 112 on the first substrate 101a is a pixel electrode and is electrically connected to a pixel driving voltage. For details, the first electrode 112 (pixel electrode) is electrically connected to an active device T which is controlled by a scan line SL and a data line DL as shown in FIG. 3A, and a driving voltage may be applied to the first electrode 112 (pixel electrode) through the active device T. The second electrode 113 on the second substrate 101b is a common electrode and is electrically connected to a common voltage Vcom. Because the first electrode 112 (pixel electrode) and the second electrode (common electrode) 113 have different voltages, a lateral electric field can be formed between the first electrode 112 (pixel electrode) and the second electrode 113 (common electrode). In particularly, the first electrode 112 (pixel electrode) and the second electrode 113 (common electrode) are respectively disposed on the first protrusion 110a and the second protrusion 110b, and the smallest vertical gap h between the first electrode 112 (pixel electrode) and the second electrode 113 (common electrode), is smaller than the cell gap and therefore the lateral electric field formed between the first electrode 112 (pixel electrode) and the second electrode 113 (common electrode) is stronger and the driving voltage can be reduced.

The display medium 130 is sandwiched between the first substrate 101a and the second substrate 101b. The display medium 130 comprises a blue phase liquid crystal (BPLC), polymer-stabilized BPLC composite, or any other liquid crystal that has an optically isotropic voltage-off state. In addition, a cell gap between the first substrate 101a and the second substrate 101b, which is also a thickness of the display medium 130 between the first substrate 101a and the second substrate 101b, is in a range from 2 μm to 100 μm.

In the exemplary embodiment of the display device, the display device further comprises a first polarizer 100a, a second polarizer 100b and at least one retardation film 120. The first polarizer 100a and the second polarizer 100b are respectively disposed on outer surfaces of the first substrate 101a and the second substrate 101b. The first polarizer 100a and the second polarizer 100b may be linear or circular polarizers and can be made of dichroic polymer films, such as polyvinyl-alcohol-based film, and have their transmission axis perpendicular to each other or handedness opposite to each other.

The retardation film 120 is, for example, a biaxial film or uniaxial film, and is laminated between the polarizer 100a and the polarizer 100b to expand the viewing angle of the display device. The retardation film 120 could be a biaxial film with its Nz factor (Nz=(nx−nz)/(nx−ny)) at about 0.5 and in plane retardation d×($n_x$−$n_y$)=λ/2. Here $n_x$, $n_y$, and $n_z$ denote the refractive indices of the biaxial film, d is the film thickness, and λ is the wavelength of interest. To achieve wide view, the $n_x$ axis of the retardation film 120 is placed parallel to the absorption axis of the second polarizer 100b. In the exemplary embodiment, the in-plane phase retardation R0=d×(nx−ny) of the retardation film 120 is between 100 nm and 300 nm. The number of retardation films could be more than 1, and the retardation film 120 could be biaxial or uniaxial.

Figure 3B:
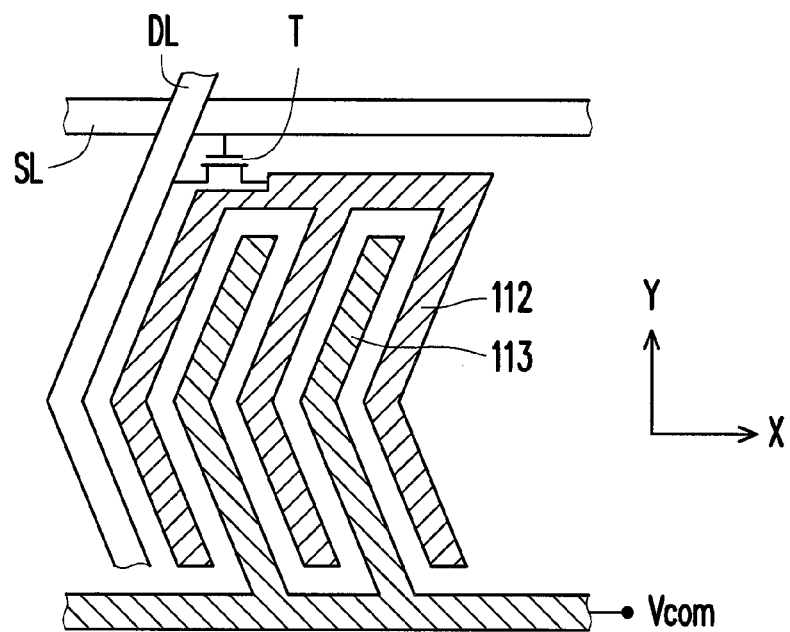
FIG. 3B is another schematic diagram showing a top view of the pixel structure in the first exemplary embodiment.

It is noted that the top view of the first electrode 112 and the second electrode 113 of FIG. 1 can be plotted in FIG. 3A with lengthwise direction along the Y-axis in the XY plane. However, the patterns of the first electrode 112 and the second electrode 113 are not limited to FIG. 3A. According to another exemplary embodiment, the first electrode 112 and second electrode 113 could also be in a zigzag shape in the XY plane as shown in FIG. 3B to further expand the viewing angle symmetry. Besides, using said zigzag electrode structures could greatly reduce the color shift of the display device, as the dependence of azimuthal angles is also reduced.

Figure 2:
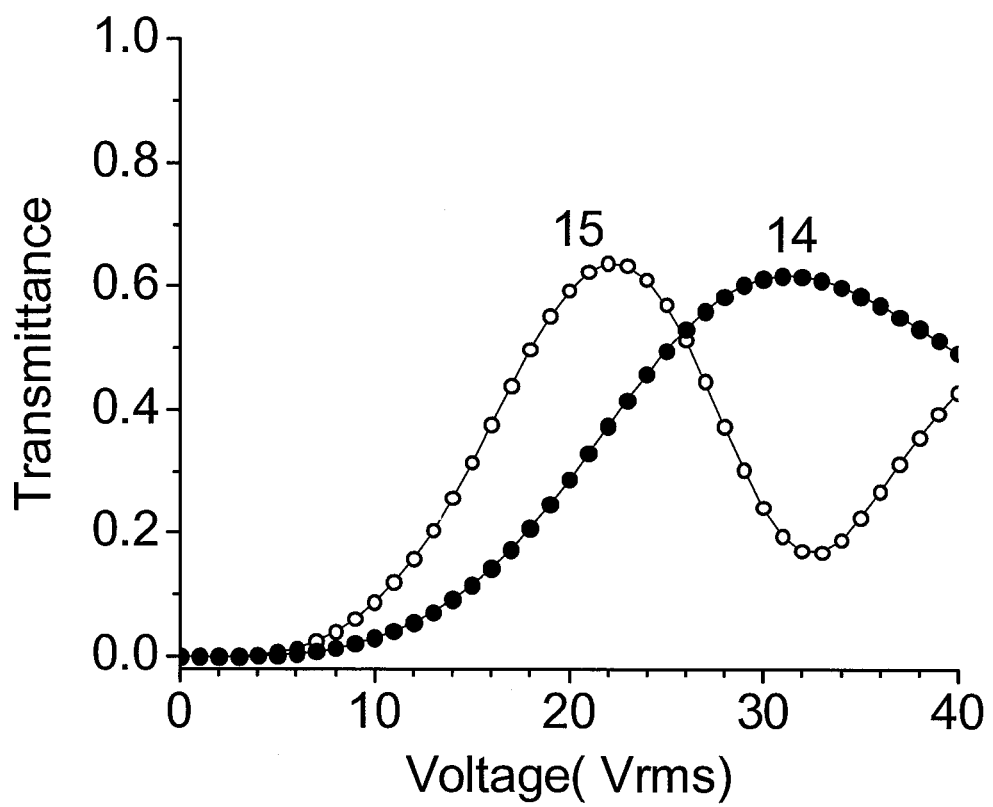
FIG. 2 shows the VT curves of the pixel structure of the LCD in the first exemplary embodiment.

FIG. 2 shows the voltage-dependent transmittance (VT) for the first exemplary embodiment. For comparison, the VT curve of a conventional IPS structure (the width of the electrode=2 μm, and the gap between the adjacent electrodes=4 μm) is also plotted (Curve 14). Curve 15 is the VT curve for an example of the first exemplary embodiment with w1, w2=2 μm; l1, l2=10 μm; h1, h2=1.5 μm for the first and second protrusions 110a, 110b on the substrates 101a, 101b, and h=1.5 μm. In FIG. 2, the on-voltage of curve 15 is significantly reduced comparing with that of the curve 14 of the conventional IPS structure.

Second Exemplary Embodiment

Figure 4A:
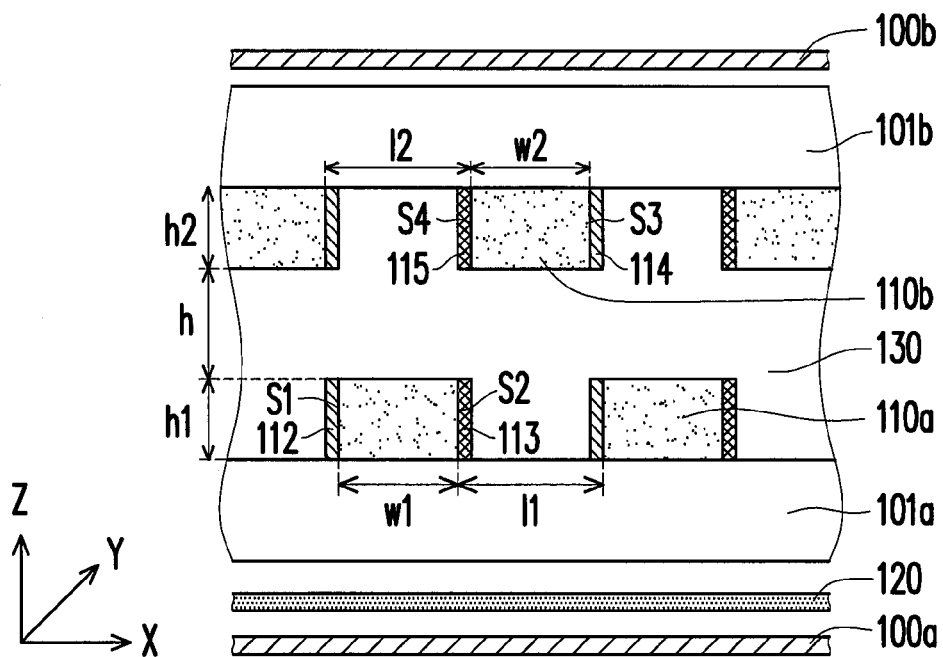
FIG. 4A, FIG. 4B and FIG. 4C show the schematic diagrams of a pixel structure of a LCD according to a second exemplary embodiment.
Figure 4B:
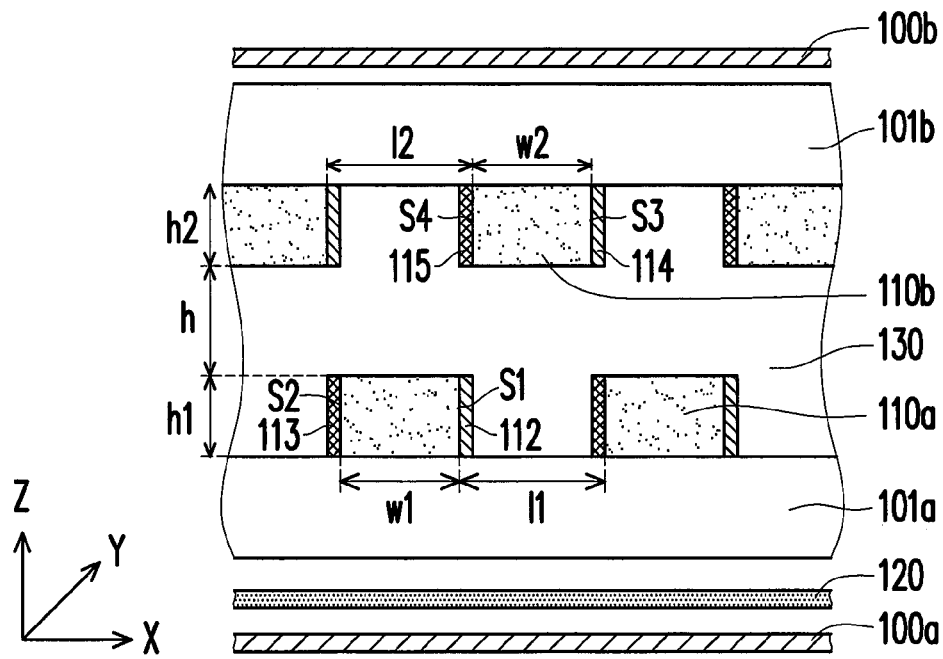
Figure 4C:
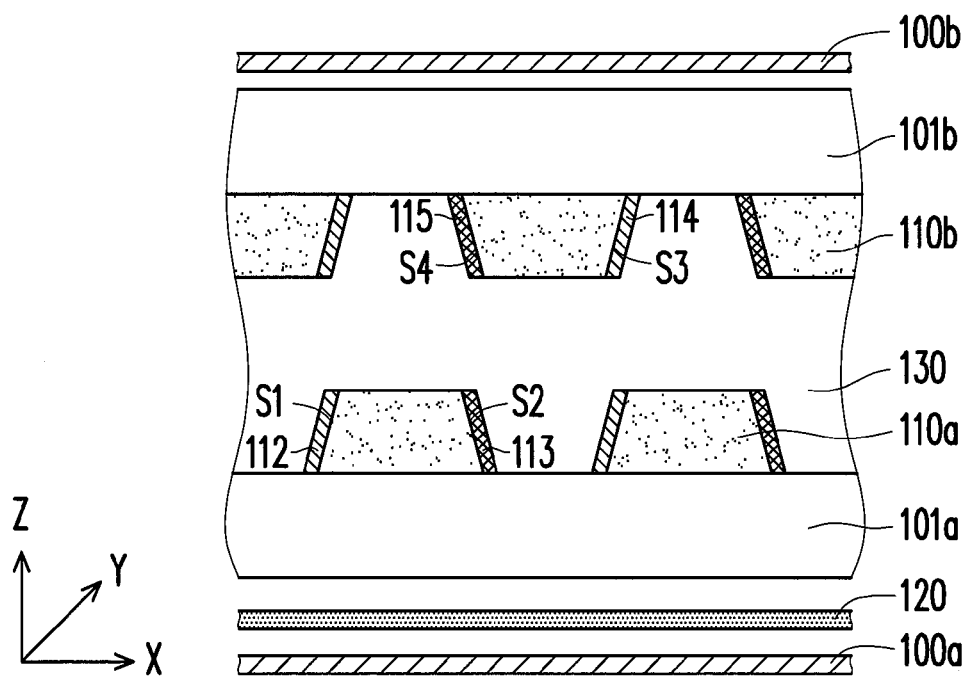

FIG. 4A, FIG. 4B and FIG. 4C shows the schematic diagrams of a pixel structure of a LCD according to a second exemplary embodiment. As shown in FIG. 4A, the display device includes a first substrate 101a, a plurality of first protrusions 110a, a first electrode 112, a second electrode 113, a plurality of second protrusions 110b, a third electrode 114, a fourth electrode 115 and a display medium 130. The embodiment depicted in FIG. 4A is similar to the embodiment depicted in FIG. 1, and the same components indicated in FIG. 4A and FIG. 1 are denoted by the same numerals and are not repeated herein.

The first protrusions 110a are disposed on the first substrate 101a, and each first protrusion 110a has a first side wall S1 and a second side wall S2. The second protrusions 110b are disposed on the second substrate 101b, and each second protrusion 110b has a third side wall S3 and a fourth side wall S4. The widths of first and second protrusions w1, w2 range from 0.2 μm~100 μm. The horizontal gaps l1, l2 between adjacent first protrusions 110a and between adjacent second protrusions 110b range from 0.2 μm~100 μm. The thickness of first and second protrusions h1, h2 could be from 0.2 μm to 100 μm. The first and second protrusions are separated by a vertical gap h which ranges from −100 μm~100 μm.

The first electrode 112 is on the first side wall S1 of each first protrusion 110a, the second electrode 113 is on the second side wall S2 of each first protrusion 110a, and a lateral electric field is formed between the first electrode 112 on the first side wall S1 of each first protrusion 110a and the second electrode 113 on the second side wall S2 of the adjacent first protrusion 110a. The third electrode 114 is disposed on the third side wall S3 of each second protrusion 110b, the fourth electrode 115 is on the fourth side wall S4 of each second protrusion 110b, and a lateral electric field is formed between the third electrode 114 on the third side wall S3 of each second protrusion 110b and the fourth electrode 115 on the fourth side wall S4 of the adjacent second protrusion 110b.

According to the embodiment, the first electrode 112 and the third electrode 114 are electrically connected to the same pixel driving voltage. For details, the first electrode 112 and the third electrode 114 are electrically connected to an active device which is controlled by a scan line and a data line, and a driving voltage may be applied to the first electrode 112 and the third electrode 114 through the active device. Therefore, the first electrode 112 and the third electrode 114 may also be referred to a pixel electrode. The first electrode 112 and the third electrode 114 can be directly connected to each other, or electrically connected to each other through a contact structure.

The second electrode 113 and the fourth electrode 115 are electrically connected to a common voltage. The second electrode 113 and the fourth electrode 115 can be directly connected to each other, or electrically connected to each other through a contact structure, or respectively electrically connected to the common voltage. Therefore, the second electrode 113 and the fourth electrode 115 may also be referred to a common electrode.

Because the first electrode 112 and the second electrode 113 have different voltages, a lateral electric field can be formed between the first electrode 112 and the second electrode 113. Because the third electrode 114 and the fourth electrode 115 have different voltages, a lateral electric field can be formed between the third electrode 114 and the fourth electrode 115. In particular, the lateral electric field formed between the first electrode 112 and the second electrode 113 is displaced in a horizontal direction with the lateral electric field formed between the third electrode 114 and the fourth electrode 115, and therefore, more display medium 130 can be driven by the lateral electric fields so as to increase the transmittance of the display device.

In the exemplary embodiment, the display device may further comprises a first polarizer 100a, a second polarizer 100b and at least one retardation film 120, and they are the same or similar to the first polarizer 100a, the second polarizer 100b and the retardation film 120 described in the first exemplary embodiment.

A similar structure is shown in FIG. 4B, the different between the structure of FIG. 4B and the structure of FIG. 4A lies in that the positions of first electrode 112 and second electrode 113 are complementary. In FIG. 4B, the first electrode 112 is aligned close to the fourth electrode 115, and the second electrode 113 is aligned close to the third electrode 114. However, in FIG. 4A, the first electrode 112 is aligned close to the third electrode 114 and the second electrode 113 is aligned close to the fourth electrode 115 There could be some alignment tolerance in the embodiment.

Figure 4D:
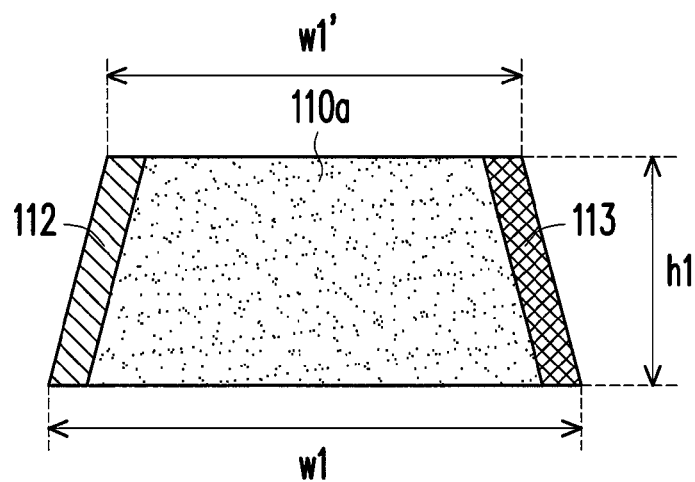
FIG. 4D and FIG. 4E show the schematic diagrams of the first and second protrusions of FIG. 4C.
Figure 4E:
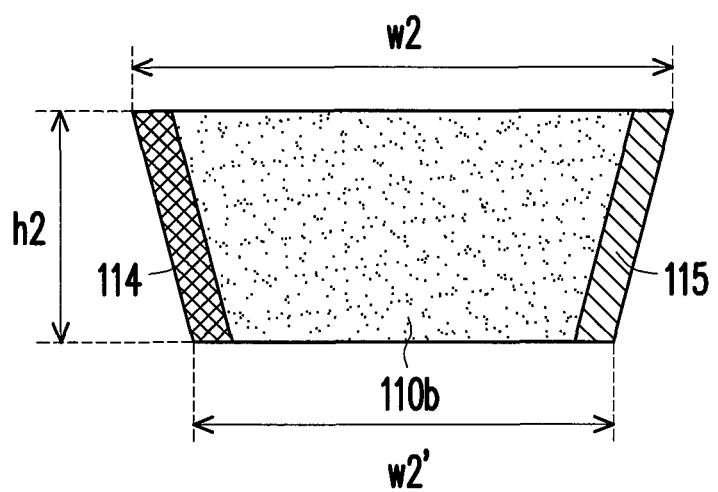

FIG. 4C depicts another example of the second exemplary embodiment, where the shape of the first protrusion 110a and the second protrusion 110b is trapezoid instead of rectangle. This shape is more likely to be formed in real fabrication. In addition, the definition of the other parameters is the same as in FIGS. 4A and 4B. In particular, the first protrusion 110a has a bottom width w1, a top width w1' and a thickness h1 (as shown in FIG. 4D), and the second protrusion 110b has a bottom width w2, a top width w2' and a thickness h2 (as shown in FIG. 4E). The widths w1, w2 respectively range from 0.2 μm to 100 μm. The widths w1', w2' are smaller than the widths w1, w2. The thicknesses h1, h2 respectively range from 0.2 μm to 100 μm.

As FIGS. 4A, 4B and 4C shown, the first protrusions 110a and the second protrusions 110b are complementarily aligned, so that the transmittance profile would be uniform along the X direction and a high averaged transmittance can be obtained. The shapes of the first and second protrusions 110a, 110b from the cross-sectional view are the same or different. There could be some horizontal shift of top and bottom protrusions.

Figure 5:
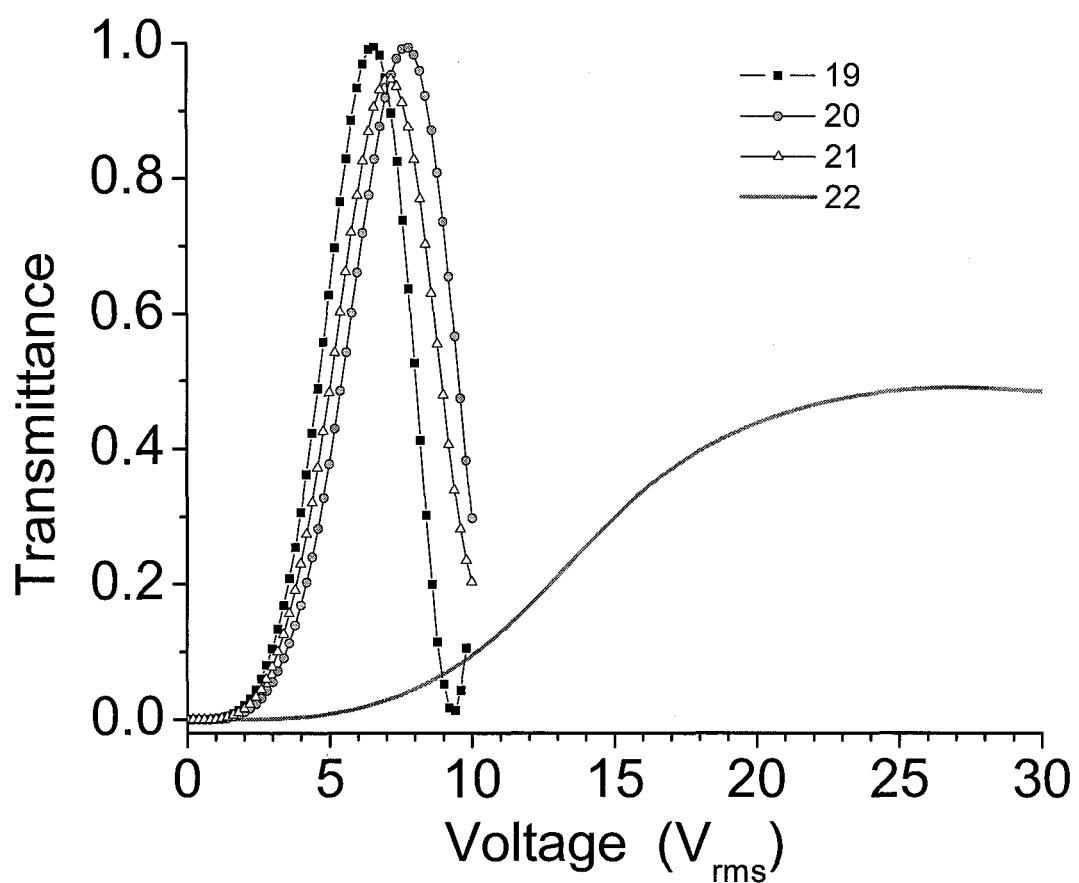
FIG. 5 shows the VT curves of the pixel structure of the LCD in the second exemplary embodiment.

FIG. 5 shows the voltage-dependent transmittance for the display devices of the second exemplary embodiment and a conventional display device with the IPS structure. Curve 19 and 20 are for the structure shown in FIG. 4A, where the first and second protrusions are rectangular; and curve 21 is for the structure depicted in FIG. 4C where the first and second protrusions are trapezoid. For comparison, the VT curve of a conventional display device with the IPS structure (the width of the electrode=2 μm, the space between the electrodes=2 μm) is also plotted (Curve 22).

In the display device with the first and second rectangular protrusions (FIG. 4A and FIG. 4B), for w1, w2=2 μm; l1, l2=2 μm; h1, h2=3 μm, and h=1 μm, a peak transmittance of 99.5% is achieved at 6.6 $V_{rms}$ as shown in curve 19; for w1, w2=2 μm; l1, l2=2 μm; h1, h2=2 μm, and h=1 μm, a peak transmittance of 99.4% occurs at 7.8 $V_{rms}$ as shown in curve 20. The high transmittance is a result of uniform distributed transmittance profile all along the x direction, which is due to three main reasons. First, the pixel and common electrodes are formed on the steep sides of the rectangular protrusions, so that the electric fields induced between them are uniform. These areas are called effective regions. Second, the top and bottom substrates are aligned in such a way that the top and bottom effective regions could just compensate each other. Third, the width of the first and second protrusions is equal to the gap between the pixel electrode and the common electrode, so that the phase retardation along X direction remains uniform after superimposition. If the width of the first and second protrusions is larger than the horizontal gap between the pixel electrode and the common electrode, there would be some regions where the top and bottom protrusions overlap and create dead zones. On the other hand, if the width of the first and second protrusions is smaller than the horizontal gap between the pixel electrode and the common electrode, some regions accumulate phase retardation from both top and bottom effective regions, while the other regions only accumulate from one effective region. In both cases, peak transmittance cannot be obtained at different X locations simultaneously, and the non-uniform transmittance distribution along the X-direction leads to a lower average transmittance.

The low operating voltage relies on the following factors.

In these proposed structures, a larger thickness (h1, h2) leads to a more effective depth $d_{eff}$ which in turn contributes to phase retardation $d_{eff}\Delta n(E)$. Thus the requirement for $\Delta n(E) \propto E^2$ is less stringent, and consequently smaller E field and voltage are needed to achieve the same phase retardation. As a result, operating voltage is significantly reduced. It is easy to derive that the operating voltage is approximately inversely proportional to the (thickness)$^{1/2}$. Namely, the larger thickness is, the lower the operating voltage, meanwhile, the more difficult the fabrication would be.

In terms of operating voltage, the gap (l1, l2) plays a similar role as the thickness (h1, h2). From E=V/1, we know that the operating voltage is proportional to the gap (l1, l2). Namely, the smaller the gap (l1, l2) is, the lower the operating voltage.

Moreover, a structure with a larger thickness (h1, h2) tends to have a slightly higher transmittance as compared curve 19 with 20. It is because the phase retardation is mainly contributed by the effective region right between the first protrusions (or the second protrusions) on the same side, but partially contributed by the gap region between first protrusion and second protrusion. The latter has an IPS like distribution of electric fields and phase retardation profile, which is not completely uniform along the X direction. The larger the ratio h/h1 or h/h2 is, the more this part would count in average transmittance, and reduce the transmittance by its non-uniform property. So larger thickness (h1, h2) would dilute this negative effect, and maintain the high transmittance. Meanwhile, the vertical gap h works in the opposite way, but its influence is not significant. When the vertical gap h=3 μm, the transmittance remains as high as 97.7% while the on-state voltage is still ~6.6 $V_{rms}$. Also this means it is not sensitive to the cell gap variation.

Curve 21 in FIG. 5 is the VT curve for the structure with the first and second trapezoid protrusions (as depicted in FIG. 4C) where w1, w2=2 μm; w1', w2'=1 μm, l1, l2=2 μm; h1, h2=3 μm, and h=1 μm. The parameters are almost the same as those in curve 19 except that the first and second protrusions are now trapezoid. In this case, the electro-optical performance is still excellent with 95% transmittance and 7.2$V_{rms}$ on-state voltage. The higher operating voltage is a result of a larger effective gap between the pixel electrode and the common electrode in the horizontal direction.

The protrusion shape is not limited to the rectangle, or trapezoid, but could be polygonal, semicircular or any other shape. The wall-shape structure is preferred due to its superior performance in both low driving voltage and extremely high transmittance. Trapezoid protrusion structure, which maintains a good performance, is very useful, because it is most likely to be formed in real fabrication. In all abovementioned cases, electrodes are coated on the steep walls of the protrusion, but they could be extended to the flat top of the protrusions.

Third Exemplary Embodiment

Figure 6A:
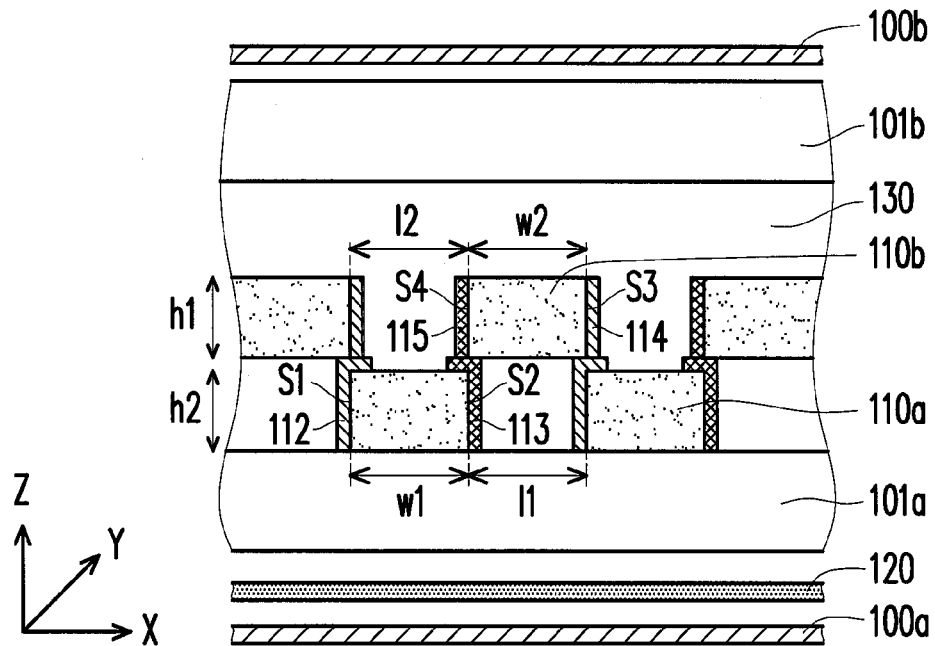
FIG. 6A, FIG. 6B and FIG. 6C show the schematic diagrams of a pixel structure of a LCD according to a third exemplary embodiment.
Figure 6B:
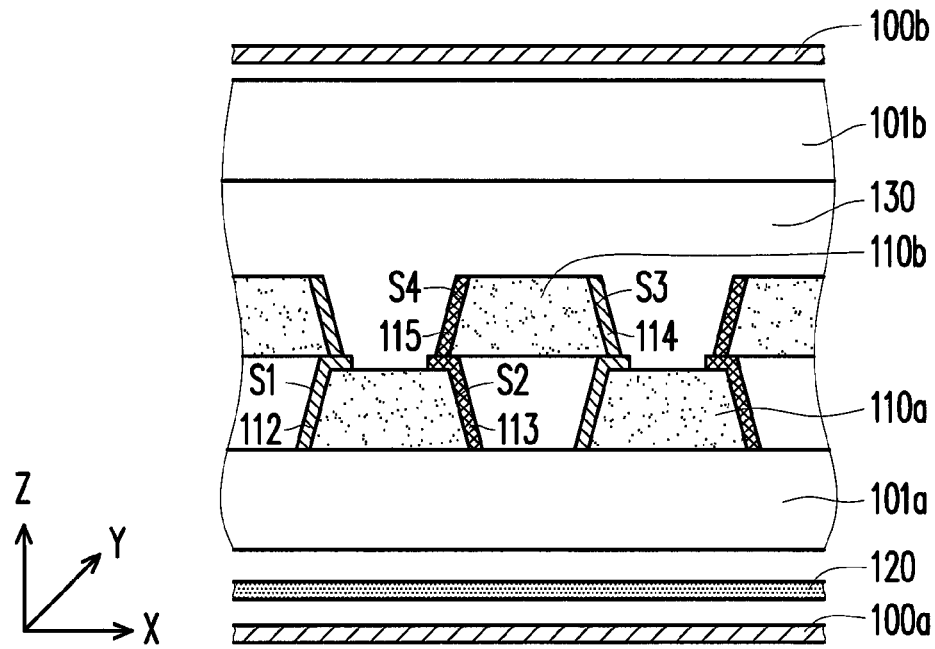
Figure 6C:
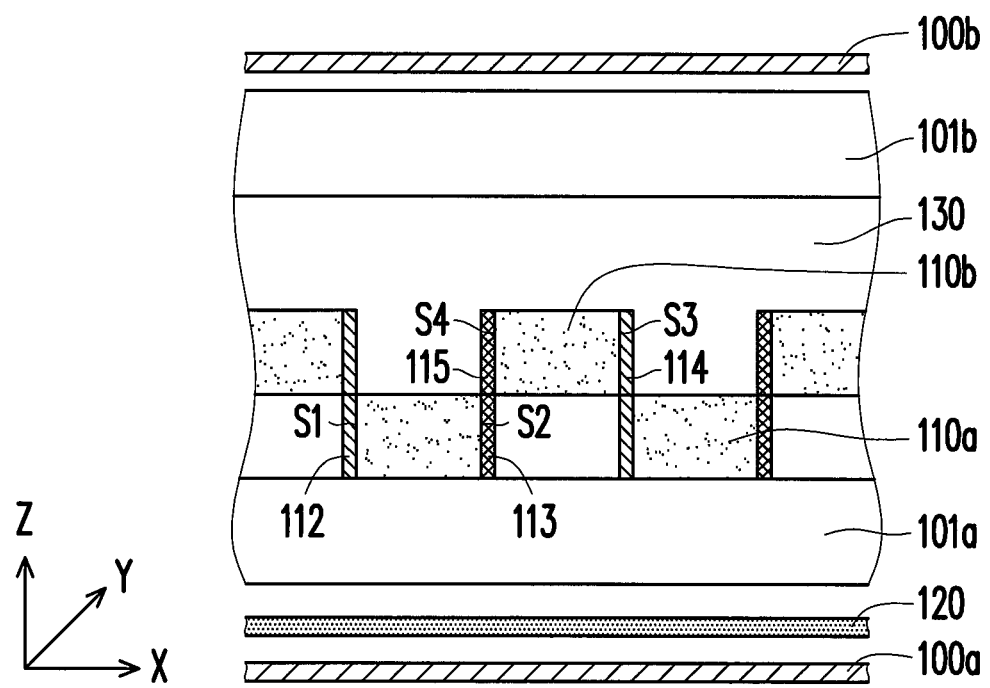

FIG. 6A, FIG. 6B and FIG. 6C show the schematic diagrams of a pixel structure of a LCD according to a third exemplary embodiment. As shown in FIG. 6A, the display device includes a first substrate 101a, a plurality of first protrusions 110a, a first electrode 112, a second electrode 113, a plurality of second protrusions 110b, a third electrode 114, a fourth electrode 115 and a display medium 130. The embodiment depicted in FIG. 6A is similar to the embodiment depicted in FIG. 4A, and the same components indicated in FIG. 6A and FIG. 4A are denoted by the same numerals and are not repeated herein.

In the FIG. 6A, the first protrusions 110a are disposed on the first substrate 101a, and each first protrusion 110a has a first side S1 wall and a second side wall S2. The second protrusions 110b are stacked on the first protrusions 110a, and each second protrusion 110b has a third side wall S3 and a fourth side wall S4. The widths of first and second protrusions w1, w2 range from 0.2 μm~100 μm. The horizontal gaps l1, l2 between adjacent first protrusions 110a and between adjacent second protrusions 110b range from 0.2 μm~100 μm. The thicknesses h1, h2 of the first and second protrusions could be from 0.2 μm to 100 μm.

The first electrode 112 is disposed on the first side wall S1 of each first protrusion 110a, and the second electrode 113 is disposed on the second side wall S2 of each first protrusion 110a. A lateral electric field is formed between the first electrode 112 on the first side wall S1 of each first protrusion 110a and the second electrode 113 on the second side wall S2 of the adjacent first protrusion 110a. The third electrode 114 is disposed on the third side wall S3 of each second protrusion 110b and contacts with the first electrode 112 on the first protrusions 110a. The fourth electrode 115 is on the fourth side wall S4 of each second protrusion 110b and contacts with the second electrode 113 on the first protrusions 110a. A lateral electric field is formed between the third electrode 114 on the third side wall S3 of each second protrusion 110b and the fourth electrode 115 on the fourth side wall S4 of the adjacent second protrusion 110b.

Similarly, the first electrode 112 and the third electrode 114 are electrically connected to the same pixel driving voltage, and thus the first electrode 112 and the third electrode 114 may also referred to a pixel electrode. For details, the first electrode 112 and the third electrode 114 are electrically connected to an active device which is controlled by a scan line and a data line, and a driving voltage may be applied to the first electrode 112 and the third electrode 114 through the active device. The second electrode 113 and the fourth electrode 115 are electrically connected to a common voltage, and thus the second electrode 113 and the fourth electrode 115 may also referred to a common electrode. Because the first electrode 112 and the second electrode 113 have different voltages, the lateral electric field can be formed between the first electrode 112 and the second electrode 113. Because the third electrode 114 and the fourth electrode 115 have different voltages, the lateral electric field can be formed between the third electrode 114 and the fourth electrode 115. In particular, the lateral electric field formed between the first electrode 112 and the second electrode 113 is complementary with the lateral electric field formed between the third electrode 114 and the fourth electrode 115, and therefore, more display medium 130 can be driven by the lateral electric fields so as to increase the transmittance of the display device.

According to the embodiment, the first electrode 112 extends to the flat top of first protrusions 110a so as to electrically connect the first electrode 112 and the third electrode 114. The second electrode 113 extends to the flat top of the first protrusions 110a so as to electrically connect the second electrode 113 and the fourth electrode 115. In addition, the third electrode 114 and the fourth electrode 115 are not extended to the flat top of protrusions 110b, which are not limited by the disclosure.

In the exemplary embodiment, the display device may further comprise a first polarizer 100a, a second polarizer 100b and at least one retardation film 120, and they are the same or similar to the first polarizer 100a, the second polarizer 100b and the retardation film 120 described in the first exemplary embodiment.

In such a structure, the transmittance in the spacing between the first protrusions 110a and that between the second protrusions 110b are very similar. Therefore, the uniformly distributed transmittance profile results in a high averaged transmittance. Because the pixel electrodes 114 and 112 are electrically connected and the common electrode 115 and 113 are electrically connected, one active device (thin film transistor) is needed, and aperture ratio and optical efficiency are improved.

A similar structure is shown in FIG. 6B. The difference from the structure of FIG. 6A lies in that the shape of the first protrusion 110a and the second protrusion 110b is trapezoid. FIG. 6C depicts another example of the third exemplary embodiment, where the shape of the first protrusion 110a and the second protrusion 110b is rectangle, and the bottom width of the protrusions 110b is equal to the top width of the spacing between first protrusions 110a, as shown in FIG. 6C. In addition, no extension for the pixel electrodes 112, 114 and the common electrode 113, 115 is needed, and thus a higher optical efficiency is obtained.

Fourth Exemplary Embodiment

Figure 7A:
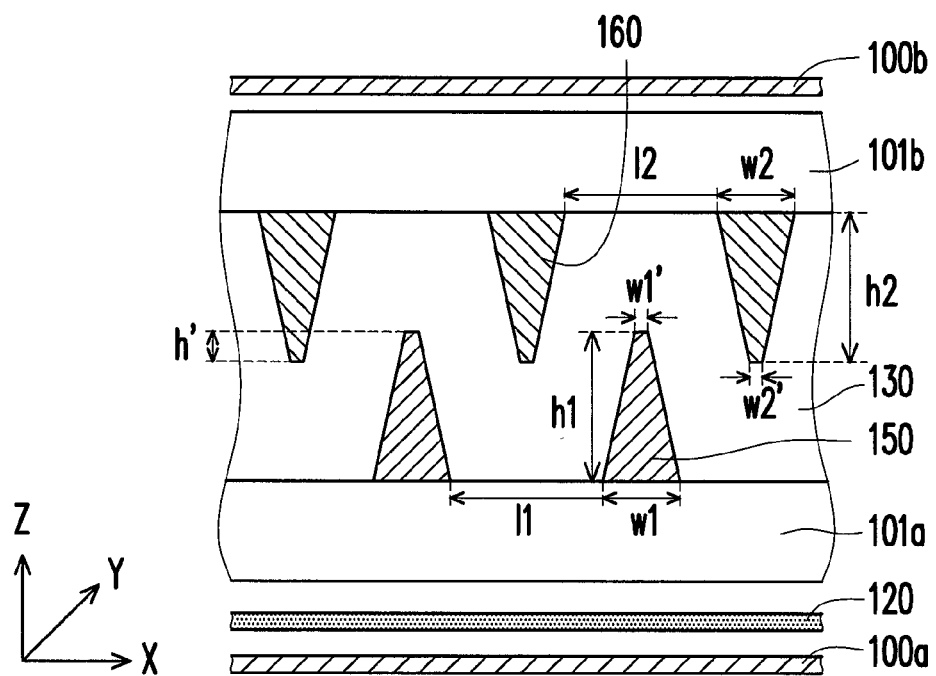
FIG. 7A and FIG. 7B show the schematic diagrams of a pixel structure of a LCD according to a fourth exemplary embodiment.
Figure 7B:
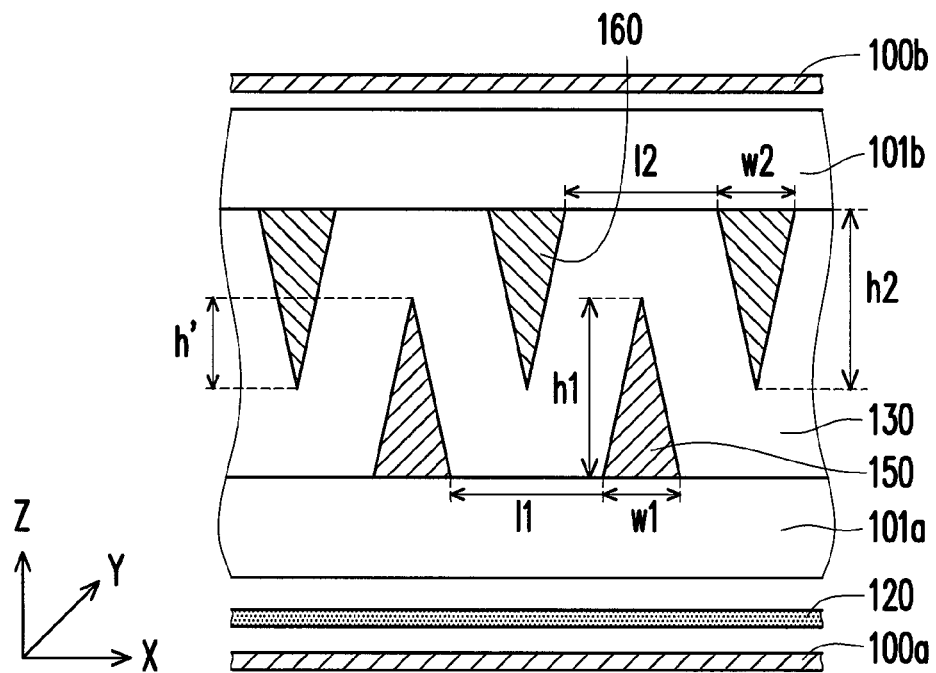

FIG. 7A and FIG. 7B show the schematic diagrams of a pixel structure of a LCD according to a fourth exemplary embodiment. As shown in FIG. 7A, the display device comprises a first substrate 101a, at least one first bump electrode 150, a second substrate 101b, at least one second bump electrode 160, and a display medium 130. The embodiment depicted in FIG. 7A is similar to the embodiment depicted in FIG. 1, and the same components indicated in FIG. 7A and FIG. 1 are denoted by the same numerals and are not repeated herein.

The first bump electrode 150 is disposed on the first substrate 101a. The second bump electrode 160 is disposed on the second substrate 101b, wherein the first bump electrode 150 and the second bump electrode 160 are displaced in a horizontal direction so as to form a lateral electric field therebetween. According to the embodiment, the first bump electrode 150 and the second bump electrode 160 are misaligned to each other in XY plane, and thus the first bump electrode 150 and the second bump electrode 160 are not overlapped to each other in XY plane. The first bump electrode 150 and the second bump electrode 160 can be made of a conductive polymer, for example. In addition, the first bump electrode 150 and the second bump electrode 160 may have the same or different shapes from the cross-sectional view. The thickness h1 of the first bump electrode 150 and the thickness h2 of the second bump electrode 160 could be from 0.2 μm to 20 μm. In particular, an overlapping height h' between the first bump electrode 150 and the second bump electrode 160 in the vertical direction (Z direction) is larger than 0 and smaller than a cell gap between the first substrate 101a and the second substrate 101b. In the embodiment, the cell gap between the first substrate 101a and the second substrate 101b, which is also a thickness of the display medium 130 between the first substrate 101a and the second substrate 101b, is in a range from 2 μm to 100 μm.

Moreover, the bottom width w1 of the first bump electrode 150 and the bottom width w2 of the second bump electrodes 160 may be the same or different, which respectively range from 0.2 μm to 100 μm. The top widths w1', w2' of the first bump electrode 150 and the second bump electrode 160 are smaller than the bottom widths w1, w2. The gap 11 between two adjacent first bump electrodes 150 on the first substrate 101a and the gap 12 between two adjacent second bump electrodes 160 on the second substrate 101b may respectively range from 0.2 μm to 100 μm.

According to the exemplary embodiment, the first bump electrode 150 on the first substrate 101a is a pixel electrode and is electrically connected to a pixel driving voltage. For details, the first bump electrode 150 (pixel electrode) is electrically connected to an active device which is controlled by a scan line and a data line, and a driving voltage may be applied to the first bump electrode 150 (pixel electrode) through the active device. The second bump electrode 160 on the second substrate 101b is a common electrode and is electrically connected to a common voltage. Because the first bump electrode 150 (pixel electrode) and the second bump electrode 160 (common electrode) have different voltages, a lateral electric field can be formed between the first bump electrode 150 (pixel electrode) and the second bump electrode 160 (common electrode). In particularly, the overlapping height h' between the first bump electrode 150 and the second bump electrode 160 in the vertical direction (Z direction) is larger than 0 and smaller than a cell gap between the first substrate 101a and the second substrate 101b, the lateral electric field formed between the first bump electrode 150 (pixel electrode) and the second bump electrode 160 (common electrode) is stronger and the driving voltage can be reduced.

In the exemplary embodiment, the display device may further comprises a first polarizer 100a, a second polarizer 100b and at least one retardation film 120, and they are the same or similar to the first polarizer 100a, the second polarizer 100b and the retardation film 120 described in the first exemplary embodiment.

A similar structure is shown in FIG. 7B, the different between the structure of FIG. 7B and the structure of FIG. 7A lies in that the first bump electrode 150 and the second bump electrode 160 respectively have a triangle shape. The shape of electrodes 150 and 160 are not limited to trapezoid or rectangle, but can be anything that fabrication allows.

Figure 8:
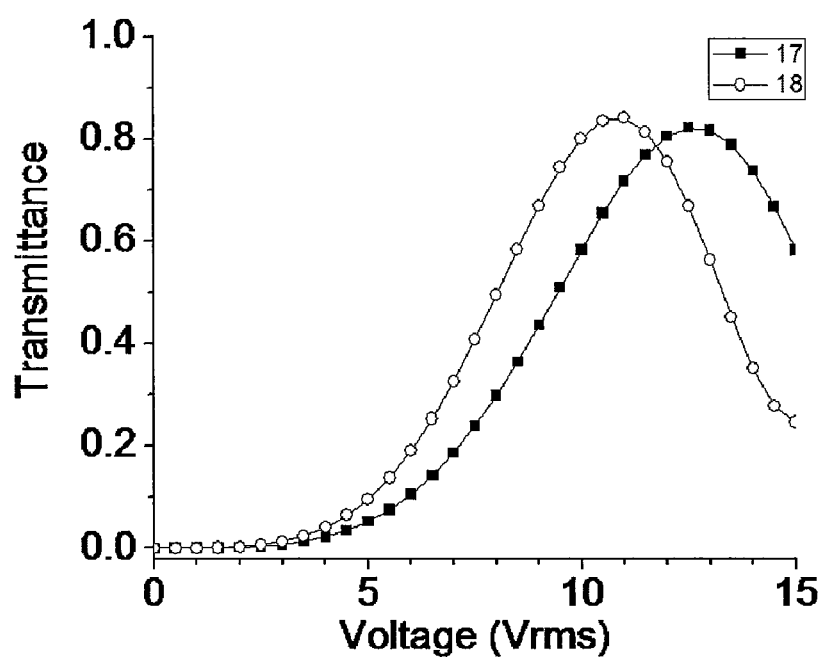
FIG. 8 shows the VT curves of the pixel structure of the LCD in the fourth exemplary embodiment.

FIG. 8 shows the VT curves of the pixel structure of the LCD in the fourth exemplary embodiment. Curve 17 and 18 are for the structure shown in FIG. 7B. Curve 17 represents the VT curve for the display device with the first and second bump electrodes, wherein w1, w2=2 μm; l1, l2=6 μm; h1, h2=4 μm; and h'=1 μm. Curve 18 represents the VT curve for the display device with the first and second bump electrodes, wherein w1, w2=2 μm; l1, l2=6 μm; h1, h2=4 μm; and h'=2 μm. The driving voltage (on voltage) of the display device (curve 18) is lower than the driving voltage (on voltage) of the display device (curve 17).

It will be apparent to those skilled in the art that various modifications and variations can be made to the structure of the disclosed exemplary embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device comprising:
a first substrate;
a plurality of first protrusions on the first substrate, each first protrusion having a first side wall and a second side wall;
a first electrode, on the first side wall of each first protrusion;
a second electrode, on the second side wall of each first protrusion, wherein a lateral electric field is formed between the first electrode on each first protrusion and the second electrode on the adjacent first protrusion;
a second substrate opposite to the first substrate;
a plurality of second protrusions on the second substrate, each second protrusion having a third side wall and a fourth side wall;
a third electrode, on the third side wall of each second protrusion;
a fourth electrode, on the fourth side wall of each second protrusion, wherein a lateral electric field is formed between the third electrode on each second protrusion and the fourth electrode on the adjacent second protrusion; and
a display medium sandwiched between the first and the second substrates.

2. The display device of claim 1, wherein the first protrusions and the second protrusions are complementarily aligned.

3. The display device of claim 1, wherein the first and second protrusions have a width ranged from 0.2 μm to 100 μm, the horizontal gaps between adjacent first protrusions and between adjacent second protrusions ranged from 0.2 μm to 100 μm, and thicknesses of the first and second protrusions ranged from 0.2 μm to 100 μm.

4. The display device of claim 1, wherein shapes of the first and second protrusions from the cross-sectional view are the same or different.

5. The display device of claim 1, wherein the first electrode is aligned to the third electrode in a vertical direction, and the second electrode is aligned to the fourth electrode in the vertical direction.

6. The display device of claim 1, wherein the first electrode is aligned to the fourth electrode in a vertical direction, and the second electrode is aligned to the third electrode in the vertical direction.

7. The display device of claim 1, wherein each first protrusion has a top surface and a bottom surface larger than the top surface, and each second protrusion has a top surface and a bottom surface larger than the top surface.

8. The display device of claim 1 further comprising:
a first linear or circular polarizer disposed on the first substrate;
a second linear or circular polarizer disposed on the second substrate; and
at least one retardation film disposed between the first and second linear or circular polarizers,
wherein the retardation film is a biaxial film with its Nz factor (Nz=(nx−nz)/(nx−ny)) at about 0.5, and the in-plane phase retardation R0=d×(nx−ny) between 100 nm and 300 nm.

9. The display device of claim 1, wherein the display medium comprises a blue phase liquid crystal (BPLC), a polymer-stabilized BPLC composite or an optically isotropic liquid crystal composite.

* * * * *

UNITED STATES PATENT AND TRADEMARK OFFICE
CERTIFICATE OF CORRECTION

PATENT NO.         : 8,736,800 B2                                                         Page 1 of 1
APPLICATION NO.    : 13/348652
DATED              : May 27, 2014
INVENTOR(S)        : Yu-Pei Chang et al.

It is certified that error appears in the above-identified patent and that said Letters Patent is hereby corrected as shown below:

On the title page, the item (73) Assignees

"University of Florida Research Foundation, Inc." should be changed to -- University of Central Florida Research Foundation, Inc. --.

Signed and Sealed this
Ninth Day of September, 2014

Michelle K. Lee
*Deputy Director of the United States Patent and Trademark Office*